(12) United States Patent
Bodén

(10) Patent No.: US 6,848,835 B2
(45) Date of Patent: Feb. 1, 2005

(54) CONTACT DEVICE WITH AN OPTO-ELECTRIC CONVERTER AND FIXABLE AT A STRUCTURAL ELEMENT IN A BUILDING

(75) Inventor: Lars Bodén, Bromma (SE)

(73) Assignee: Transmode Systems AB, Stockolm (SE)

( * ) Notice: Subject to any disclaimer, the term of this patent is extended or adjusted under 35 U.S.C. 154(b) by 0 days.

(21) Appl. No.: 10/257,771
(22) PCT Filed: Mar. 20, 2001
(86) PCT No.: PCT/SE01/00577
§ 371 (c)(1), (2), (4) Date: Oct. 17, 2002
(87) PCT Pub. No.: WO01/79905
PCT Pub. Date: Oct. 25, 2001

(65) Prior Publication Data
US 2003/0053739 A1 Mar. 20, 2003

(30) Foreign Application Priority Data
Apr. 17, 2000 (SE) .............................. 0001425

(51) Int. Cl.$^7$ ..................... G02B 6/38; H01R 33/945
(52) U.S. Cl. ................................. 385/75; 439/577
(58) Field of Search ............................ 385/75, 92, 58, 385/70, 77, 94; 439/577

(56) References Cited

U.S. PATENT DOCUMENTS 4,555,810 A    11/1985  Khoe et al.
5,879,173 A  *  3/1999  Poplawski et al. .......... 439/138

FOREIGN PATENT DOCUMENTS

| DE | 4239326 | 5/1994 |
| DE | 4337905 | 5/1994 |
| EP | 0753774 | 1/1997 |
| GB | 2178919 | 2/1987 |
| WO | 98/47031 | 10/1998 |

* cited by examiner

Primary Examiner—Chandrika Prasad
(74) Attorney, Agent, or Firm—Swidler Berlin Shereff Friedman, LLP (57) ABSTRACT

The invention concerns a contact device that comprises a carrier member (10), a receiving unit (12) for receiving at least one optical fibre (14), a control circuit (16) that includes a converter for converting optical signals to electrical signals and vice versa and a first contact member (18) connected to the control circuit (16) and designed such that a second contact member may be connected to the first contact member (18) for conducting electrical signals from and to the first contact member (18). The receiving unit (12), the control circuit (16) and the first contact member (18) are fixed relative to the carrier member (10). The contact device is designed to be fixable at a structural element (20) in a room (22) or other part (22) of a building. The invention also concerns a use of the contact device.

16 Claims, 5 Drawing Sheets

CONTACT DEVICE WITH AN OPTO-ELECTRIC CONVERTER AND FIXABLE AT A STRUCTURAL ELEMENT IN A BUILDING

BACKGROUND OF THE INVENTION AND PRIOR ART

The present invention concerns a contact device, more precisely a contact device to which at least one optical fibre is led. The invention also concerns the use of such a contact device.

GB-A-2 178 919 shows a system with a network for distributing wide band signals via optical fibres. The network is particularly suited to transmit digital video signals to TV-apparatuses. The signals are led via optical fibres to a receiver/transmitter unit positioned in a TV-receiver. The signals are thus led in an optical manner all the way to the TV-apparatus.

U.S. Pat. No. 4,555,810 describes a device for the distribution of optical signals. The optical signals are led to optical wall contacts. Thereafter a conversion of the optical signals from the optical wall contacts takes place. The converter may either form a part of an apparatus, for example a TV-apparatus, or may form a part of a separate unit that is plugged into the wall contact.

EP-A-7 537 774 describes a wall socket with both electrical conductors for supply voltage and optical fibres. The wall socket is primarily intended for the purpose that the apparatus that is supplied with the supply voltage from the socket should also be able to communicate with the help of optical signals. The wall socket also comprises one or more optoelectric converters. The wall socket comprises an optical contact member that may co-operate with a corresponding optical plug. The wall socket is primarily intended to receive optical signals from an apparatus in the room and to convert these signals to electrical signals and vice versa, i.e. to convert electrical signals to optical signals and to transmit these optical signals to an apparatus in the room.

The systems that are described in the first two documents above have the disadvantage that it is necessary to arrange optoelectric converters outside of the contact device itself, either in the apparatus to which the optical signals are led or in a separate converter that is plugged into a wall socket.

An optical contact of the kind that is described in the last described document above has several disadvantages. Such an optical contact requires a relatively complicated plug with which the contact co-operates, since otherwise losses in the optical transmission between the wall socket and the plug may easily occur. Furthermore, most apparatuses that are used in a home or in an office are constructed to communicate with the help of electrical signals, which means that the need for such an optical line to an apparatus is limited.

There is an increased need for fast communication with the help of signals that are led via optical fibres. It is therefore more and more common that optical fibres are drawn to a flat or to another part of a building. The apparatuses that communicate with the help of signals that are sent via optical fibres normally require a conversion of the optical signals to electrical signals. This conversion may either take place in the apparatus itself, which requires an optical line to the apparatus, or in a separate optoelectric converter. Such a converter also requires its own current supply, which may be arranged in that the converter is powered by a battery or in that a separate line for the current supply is drawn to the converter. Furthermore, such a separate converter requires space and is often in the way when cleaning or the like is performed when it is positioned in a room, for example lying on the floor. Such a separate converter may also easily be damaged if it lies unprotected. Faults may also occur along the optical transmission that is the case in for example a flat, since the optical transmission is relatively sensible to for example dirt or other influences. Furthermore, the light from the optical fibres may be harmful if for example a child has access to the optical fibres and may direct the light towards an eye.

A further problem with prior technology is that the supplier that has the responsibility for the optical connection to a flat or other part of a building is not always responsible for damages on the connection that takes place in the flat itself or within an office.

SUMMARY OF THE INVENTION

A purpose of the present invention is to achieve a contact device with which the above-described problems are avoided and that allows for a well functioning and simple use to a user of the contact device.

This purpose is achieved by a contact device comprising a carrier member, a receiving unit for receiving at least one optical fibre, a control circuit that includes a converter for converting optical signals, which are received via said at least one optical fibre, to electrical signals and to convert electrical signals to optical signals that are to be transmitted via said at least one optical fibre, a first contact member connected to the control circuit such that electrical signals from the converter are conducted to the first contact member and such that electrical signals from the first contact member are conducted to the converter, wherein the first contact member is designed such that a second contact member can be connected to the first contact member for conducting electrical signals from and to the first contact member, wherein said receiving unit, control circuit and first contact member are fixed relative to the carrier member and wherein the contact device is designed to be fixable at a structural element in a room or other part of a building.

The receiving unit may for example consist of a sleeve, a so-called ferrule, in which the end of an optical fibre or fibre cable is arranged. The first contact member may for example be a female contact. An apparatus may thus according to this example be connected to the contact device in that the apparatus is connected to an electric cable that ends with a male contact that thus forms said second contact member. The structural element may for example be a floor or a wall in a part of a building. Preferably, but not necessarily, at least two optical fibres are connected to said receiving unit; one fibre may thereby be used to transmit signals from the contact device and another fibre to receive signals to the contact device. Since said control circuit with converter and said receiving unit form part of the contact device itself, an apparatus may be connected to the contact device without any need for a separate converter between the apparatus and the contact device. Furthermore, no optical fibre needs to be drawn from the contact device to an apparatus or to a separate converter. It should be noted that the contact device in addition to the above mentioned components, may of course also comprise further components. For example, the contact device may thus comprise further contact members in addition to the mentioned first contact member. The device may thus comprise two or more contact members of the same kind as the first contact member. This makes it possible for for example several apparatuses that are present in a room to be connected to one and the same contact device.

According to a preferred embodiment of the contact device, it is designed to be fixable at least partly lowered relative to a main surface of said structural element, which main surface faces the room or the part of the building, and wherein said receiving unit is fixed in such a position relative to the carrier member that, when the contact device is fixed in position at said structural element, the receiving unit is suited to receive said at least one optical fibre when this at least one optical fibre is led to the contact device via the structural element. According to this embodiment, the contact device may be arranged well protected. Since the optical fibre or fibres may be led to the contact device via the structural element, also these fibres may be arranged well protected. It should be noted that the contact device does not necessarily have to be fixed lowered relative to said main surface of the structural element. Alternatively, the contact device may simply be fixed at the structural element without being lowered therein. The contact device may in this case for example be designed with an outer shell in the form of a box, such that this box may be fixed at said main surface of the structural element.

According to another embodiment of the contact device, the receiving unit is designed to receive said at least one optical fibre in a direction defined by the receiving unit, which direction defines a straight line, wherein the receiving unit is arranged at said carrier member such that, when the contact device is fixed in position at said structural element, the line forms an angle relative to said main surface that is less than 45 degrees. Preferably, said angle is less than 30 degrees and according to one embodiment essentially 0 degrees. This makes it possible that the optical fibre or fibres may be led to the receiving unit when the fibres are essentially parallel to said main surface. This simplifies the connection of the optical fibres and means that undesired too sharp bends of the fibres are avoided.

According to still another embodiment of the contact device, it comprises support members arranged to enable winding of excess of said at least one optical fibre. This makes it possible for excess of optical fibres that have been drawn to the structural element to easily be wound on these support members.

According to another embodiment of the contact device, it comprises indication means connected to said control circuit for indicating different states of the contact device. A user may thereby observe different states of the contact device.

According to still another embodiment of the contact device, it comprises a protective part that is suited to be fixed relative to said carrier member, such that, when the contact device is fixed at said structural element in a room or other part of a building and said protective part is fixed relative to said carrier member, at least said control circuit, said receiving unit and said at least one optical fibre are not within reach for a person that is in the room or the other part of a building without removing at least said protective part. This means that the risk of damaging these parts is avoided. The reliability of the device is thus improved.

According to still another embodiment of the contact device, it comprises a holding member for holding a battery that may be used to provide the control circuit with a supply voltage. Such a battery may for example have the purpose to secure that necessary supply voltage is applied also in case a possible other source that provides the device with supply voltage does not work.

A further purpose of the present invention is to achieve a use of a contact device, by which use the above-described problems with prior known devices are avoided.

This purpose is achieved in that the contact device according to any of the above-described embodiments is attached to said structural element in a room in a flat or in another part of a building. The contact device, and thereby the parts that are included in the contact device are thereby fixed at the structural element, whereby is avoided that for example converters or optical fibres are separately arranged in said room or other part of a building.

According to another preferred use, the structural element comprises a recess, wherein the contact device is arranged at least partly lowered in said recess. The contact device is thus arranged protected and is not in the way in said room or other part of the building. As has been pointed out above, it is as an alternative also possible to fix the contact device at the structural element without the contact device being lowered in a recess.

According to another advantageous use the structural element is a wall. The contact device is thus fixed as a wall contact, which allows for an easy access when a cable is to be connected to the contact device.

According to still an advantageous use, the contact device is connected to a transformer that provides the contact device with a suitable supply voltage. It should be noted that the concept transformer according to this document also comprises a so-called battery eliminator.

According to still an advantageous use, the transformer is connected to alternating current mains. The transformer may thereby be connected to the common mains of for example 110 V or 220 V alternating current.

According to another advantageous use, the transformer is connected to an electrically conductive telephone line. A telephone line is often drawn to a room. Via this telephone line a suitable supply voltage may be obtained. The transformer thereby transforms this supply voltage to a voltage suitable for the control circuit of the contact device, which may for example be 6V direct current voltage.

According to another advantageous use, also said transformer is fixed at the structural element. It is thereby not necessary to have a separate transformer that perhaps will be lying loose on the floor in the room or in the other part of a building.

According to a further advantageous use, the contact device is connected to an electric wire that is drawn to the structural element and that also is connected to a supply unit that provides the contact device with a suitable supply voltage, wherein this supply unit is positioned at a distance from said structural element. The supply unit may for example be a transformer that is located in a basement of a house. Such a transformer may provide several contact devices in the house with a suitable supply voltage, which may be conducted to the contact devices via electrical lines. These electrical lines may possibly be drawn together with the fibres. Alternatively, for example already existing electrical telephone lines may be used.

According to still an advantageous use, the contact device is connected to a supervisory system, with the help of which system the function of the contact device may be managed. A supplier that is responsible for installing fibres and contact devices may thus manage the function of the contact device, for example in order to analyse possible faults.

Other advantages of the present invention will become clear from the description below.

SHORT DESCRIPTION OF THE DRAWINGS

The present invention will now be explained and exemplified with reference to the annexed figures. It should be noted that the figures only schematically show examples of embodiments of the invention.

DESCRIPTION OF EMBODIMENTS OF THE INVENTION

An embodiment of the invention will next be described with reference to FIGS. 1–5.

Figure 1:
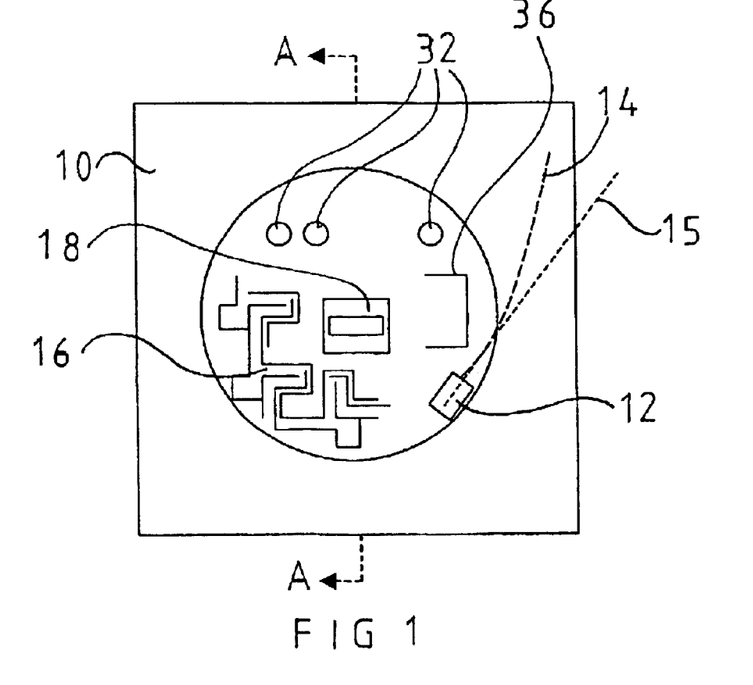
FIG. 1 shows a front view of a contact device according to the invention.
Figure 2:
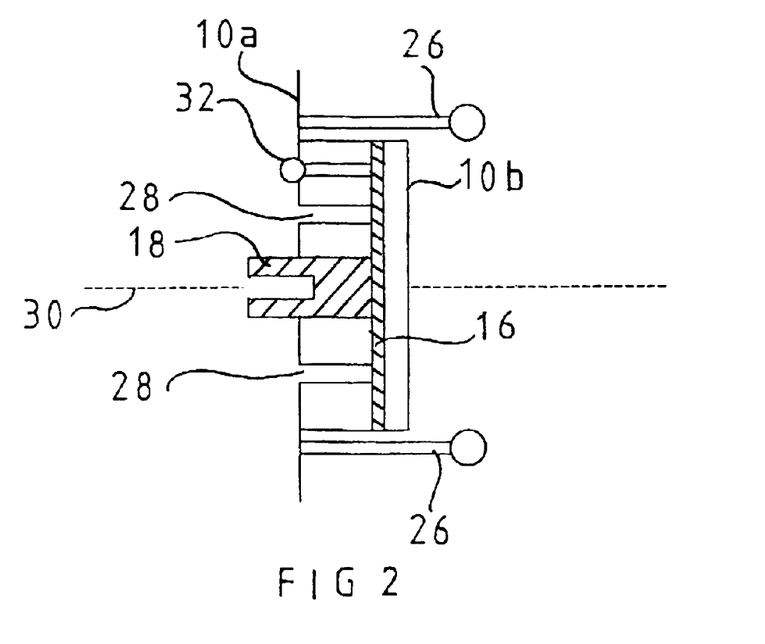
FIG. 2 shows a cross-sectional view of the contact device according to the section mark with A—A in FIG. 1.
Figure 3:
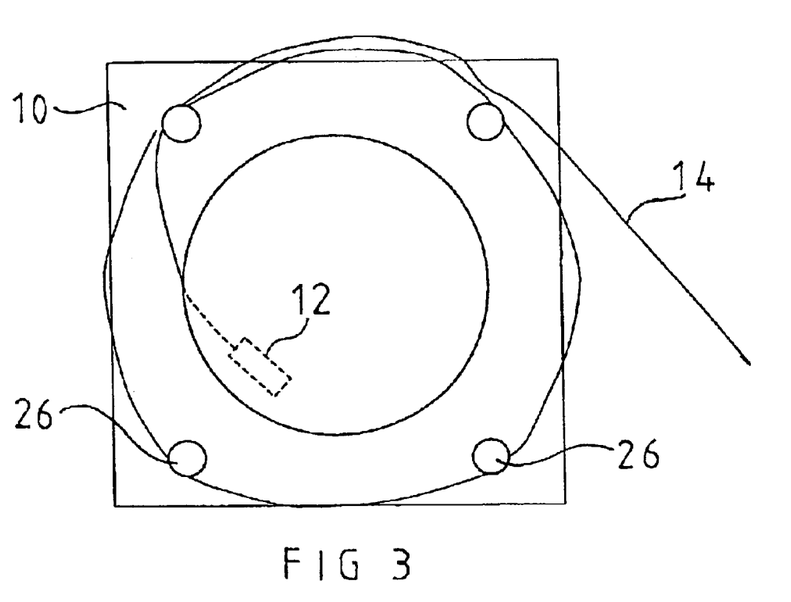
FIG. 3 shows a view from behind of the contact device according to FIG. 1.
Figure 4:
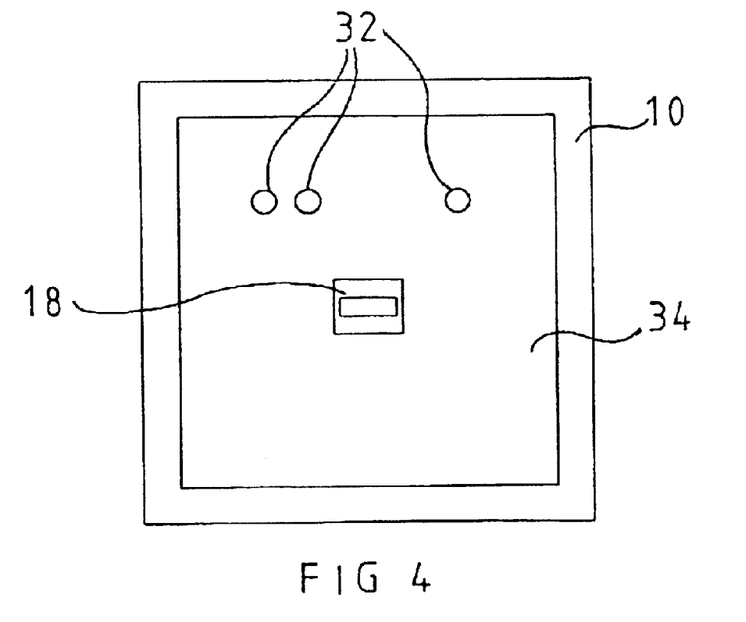
FIG. 4 shows a view similar to that according to FIG. 1 but where the contact device is provided with a protective part.
Figure 5:
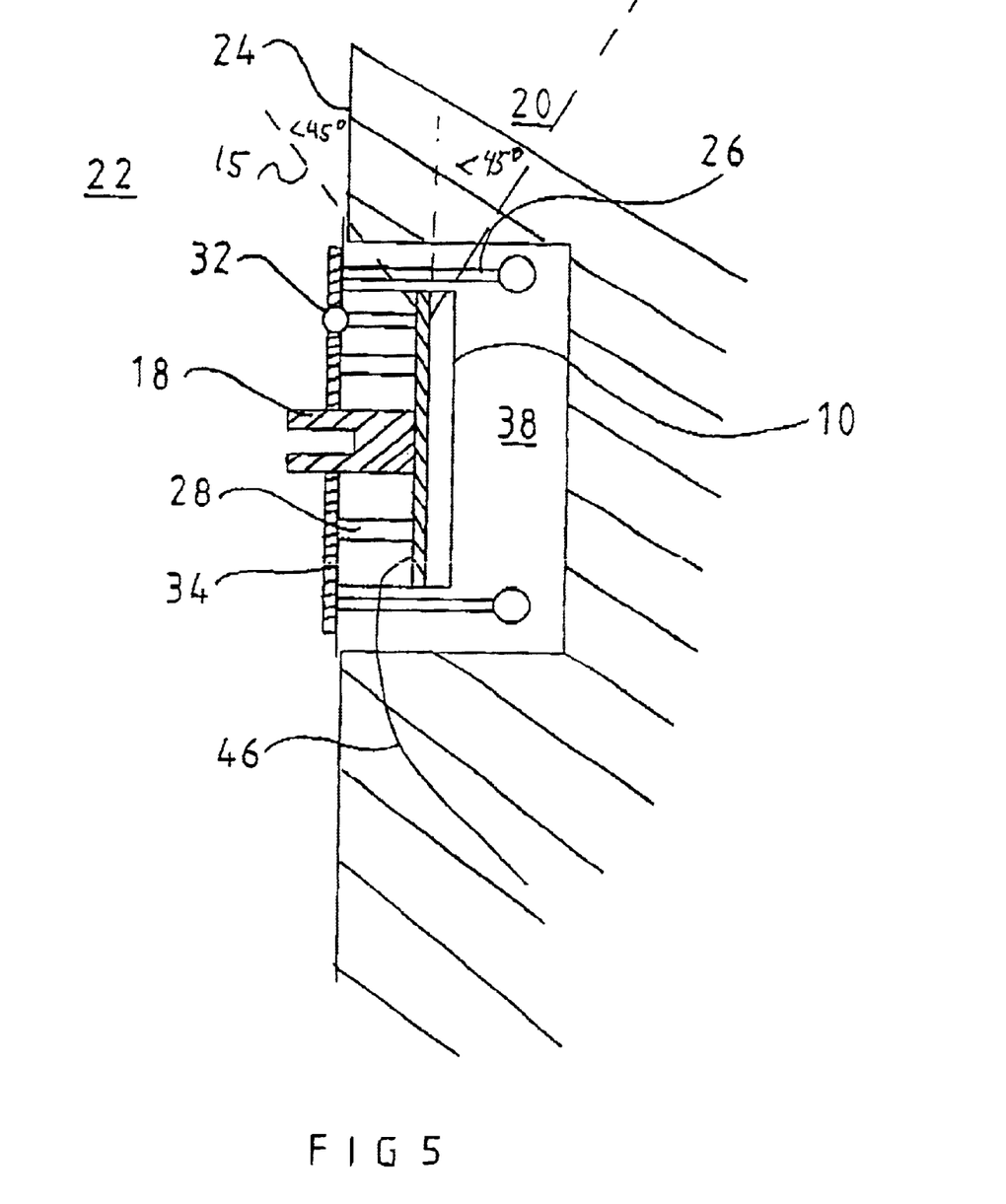
FIG. 5 shows a section similar to that of FIG. 2 but where the contact device is fixed at a wall.

The contact device thus comprises a carrier member 10. In the shown embodiment, the carrier member (see FIG. 2) has an upper part 10a and a lowered part 10b. The carrier member 10, and thereby the contact device, is according to an advantageous use suitably fixed to a structural element 20 in a room 22 or in another part 22 of a building (see FIG. 5). Suitably, the structural element 20 is a wall. As is shown in FIG. 5, the contact device is suitably designed such that it may be fixed at least partly lowered relative to a main surface 24 of the wall 20, which main surface faces the room 22 or the part 22 of the building. As has been mentioned above, it is also possible that the contact device is fixed at for example a wall 20 without being lowered into the wall 20 itself. The contact device may thereby comprise a box that simply may be secured by screws against a wall surface. The box may thereby be designed such that sensitive components are protected in the same.

A receiving unit 12 is fixed at the carrier member 10. This receiving unit 12 is designed such that an end of at least one optical fibre 14 may be arranged therein (for the sake of clarity, the fibre is only shown in FIGS. 1 and 3). It should be noted that typically at least two fibres are arranged in the receiving unit 12. Suitably one fibre may thereby be used to transmit signals and one fibre may be used to receive signals. Within the scope of the invention is however the possibility that only one fibre or more than two fibres are used. When in the description below, for the sake of simplicity, an optical fibre is described, this should be interpreted such that it may in fact be more than one fibre.

The receiving unit 12 may consist of a so-called ferrule. This may also comprise a detector for detecting incoming optical pulses and a transmitter, for example a laser, for transmitting optical pulses. Alternatively, such a detector and transmitter may be arranged separate from the receiving unit 12 and thus only be connected to the receiving unit 12. The receiving unit 12 is fixed such that it may receive the optical fibre 14 when this at least one optical fibre 14 is led to the contact device via the structural element 20, i.e. via the wall. The optical fibre 14 is thus suitably drawn to the room 22 without being drawn in the room 22 itself. It should however be noted that within the scope of the invention is the possibility that the optical fibre 14 is drawn to the contact device in the room 22 itself.

This may for example be the case when the contact device is fixed at the wall 20 without being lowered into the wall 20. The optical fibre 14 may thereby be drawn to the contact device through the room 22 itself. The optical fibre or fibres 14 may thereby lie protected within a casing. Such a casing may for example already be arranged around the fibres or the casing may consist of a tube that is arranged along for example the wall 20 or the floor in the room 22 for protecting the fibres.

The receiving unit 12 is designed to receive said optical fibre 14 in a direction 15 that is determined by in which position the receiving unit 12 is fixed at the carrier member 10. This direction 15 thus defines a straight line. The receiving unit 12 is fixed at the carrier member 10 such that, when the contact device is fixed in position at said stuctural element 20, the line 15 forms an angle relative to said main surface 24 that is less than 45 degrees. Preferably, the angle is less than 30 degrees. It is also possible that the angle is essentially 0 degrees. This means thus that said direction 15 is essentially parallel to the main surface 24 of the wall 22. This simplifies the fixation of the optical fibre 14 without it being subject to undesired bending.

The contact device also comprises support members 26 arranged to enable winding (see FIG. 3) of excess of said optical fibre 14. Suitably, the carrier member 10 comprises recesses or holes 28 for allowing the optical fibre 14 to be introduced in through a part of the carrier member 10 to the receiving unit 12. The support members 26 are suitably arranged such that the optical fibre 14 may be wound such that the wound fibre 14 is arranged essentially parallel to the main surface 24 of the wall 22 and such that the wound fibre 14 is well protected in a recess 38 in the wall 20. In case the contact device is fixed at the wall 20 without being lowered therein, the wound fibre 14 is suitably positioned protected in a box that forms a protective casing of the contact device. Furthermore, the receiving unit 12 is preferably arranged at a distance, for example 1–5 cm, preferably 2–4 cm, from an imaginary central axis 30 (see FIG. 2) through the contact device, which central axis 30 is perpendicular to the main surface 24 of the wall. The receiving unit 12 is preferably arranged such that said line 15 is essentially tangential or at least deviates with less than 30 degrees from the tangent, to an imaginary circle that passes through the receiving unit 12, wherein the circle is such that it lies in a plane that is perpendicular to said central axis 30 and such that the centre of the circle coincides with said central axis 30. The optical fibre 14 may thereby be led from the support members 26 to the receiving unit 12 without being the subject of undesired bendings.

The contact device also comprises a control circuit 16 (symbolically marked in FIG. 1) that includes a converter for converting optical signals, that are received via the optical fibre 14, to electrical signals and for converting electrical signals to optical signals that are to be transmitted via the optical fibre 14. The receiving unit 12 is connected to the control circuit 16. As has been mentioned above, parts of the converter may possibly instead be included in the receiving unit 12. It should be noted that such a control circuit 16 with optoelectric converter is known per se and will therefore not be described more closely in this description.

The contact device also comprises a first contact member 18 that is connected to the control circuit 16 such that electrical signals from the converter are conducted to the first contact member 18 and such that electrical signals from the first contact member 18 are conducted to the converter. The first contact member 18 may for example be a female contact according to some suitable standard, for example according to RJ or AUI. As has been mentioned above, it is also possible that the contact device comprises more than one of said first contact members 18. The contact device may thus for example be provided with two or more female contacts such that several apparatuses in the room may be connected to the contact device and thereby to the optical fibre or fibres that are drawn to the contact device.

The first contact member 18 is designed such that a second contact member (not shown) may be connected to the first contact member 18 to conduct electrical signals from and to the first contact member 18. The second contact member may thus be a male contact of the same standard as the first contact member. The receiving unit 12, the control circuit 16 and the first contact member 18 are fixed relative to the carrier member 10.

The contact device also comprises indication means 32 that are connected to said control circuit 16 for indicating different states of the contact device. These indication means 32 may for example be light emitting diodes. The indication means 32 may for example indicate whether transmission or reception is going on and if current supply to the control circuit 16 is the case.

The contact device also comprises a protective part 34 that is suited to be fixed relative to said carrier member 10. When the contact device is fixed at for example a wall 20 and the protective part 34 is fixed relative to the carrier member 10, the control circuit 16, the receiving unit 12 and the optical fibre 14 are not available to a person that is in the room 22. Such a person thus "sees" only the first contact member 18 (or several such contact members if the contact device includes more than one such contact member). The sensitive parts of the contact device are thus protected.

The contact device may also comprise a holding member 36 for holding a battery that may be used to provide the control circuit 16 with a supply voltage. Such a battery may for example be used as a back-up if other current supply does not work. According to a non-shown alternative, the holding member 36 may be arranged at the contact device such that the battery is available to a user that is in the room 22 without the user having to remove the protective part 34. A user may in this manner in a simple way exchange the battery.

As is shown in FIG. 5, the structural element 20, which may be a wall, is preferably provided with a recess 38, wherein the contact device is arranged at least partly lowered in the recess 38.

Figure 6:
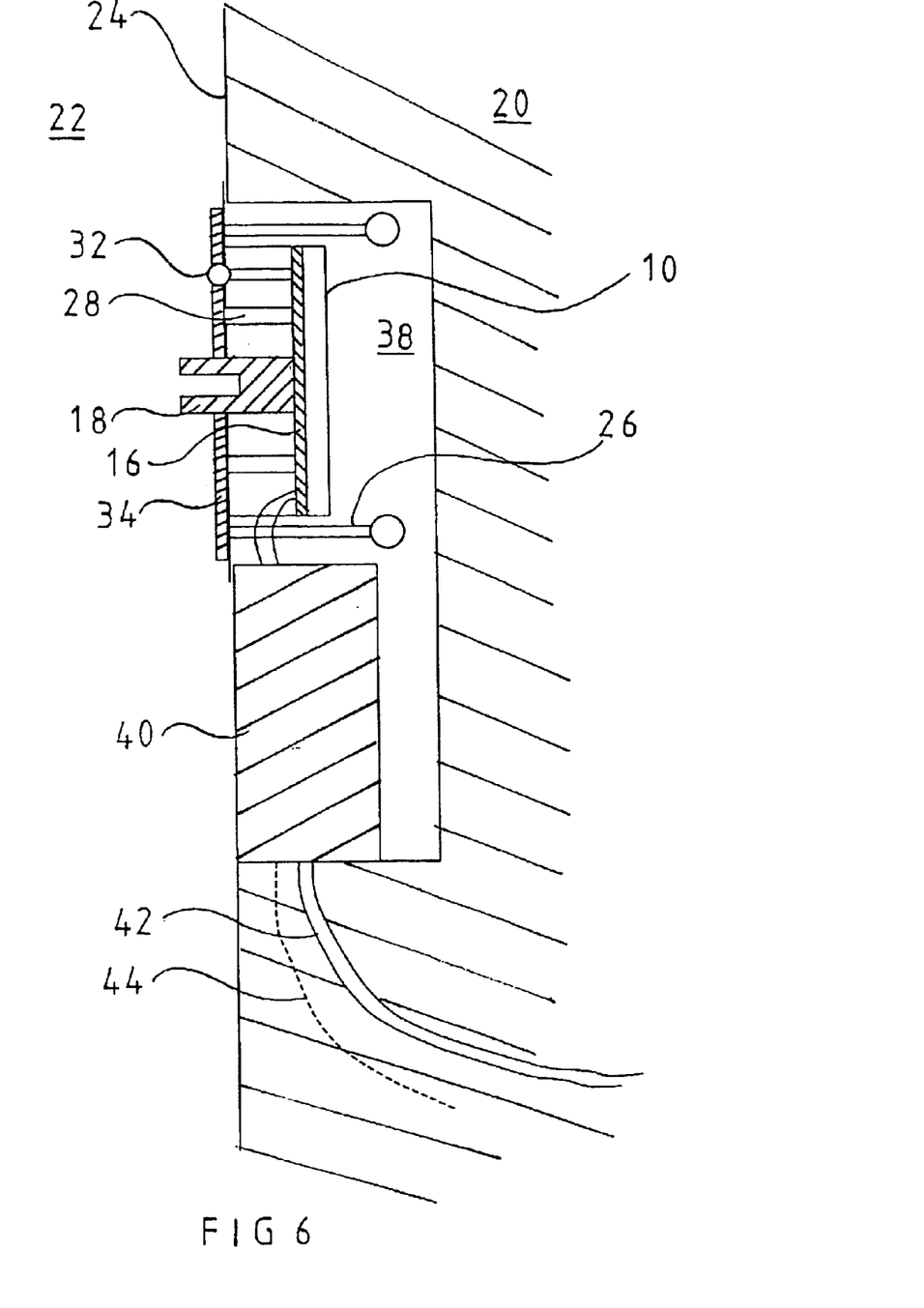
FIG. 6 shows a similar section as FIG. 5, but where also a transformer is arranged at the wall.

The control circuit 16 may suitably be of the kind that is powered with a low direct current voltage of for example 6V. In order to provide the contact device with this supply voltage, it may be connected to a transformer 40 (see FIG. 6). The transformer 40 may also be what is often called a battery eliminator. The transformer 40 may be fixed at the structural element 20. As is shown in FIG. 6, the transformer 40 may be arranged lowered into the structural element 20. Alternatively, the transformer 40 may be arranged at a distance from the structural element 20. The transformer 40 may of course also be fixed at the structural element 20 without being lowered therein. It is also possible that the transformer is designed as a plug such that it may be directly plugged into an AC wall contact of a standard form. From such a transformer, a wire may be drawn to the contact device for providing the contact device with supply voltage. Possibly, the contact device may thereby be fixed near or next to the AC wall contact.

The transformer 40 may connected to a cable 42 that forms part of the "common" alternating current mains (of for example 110 V or 220 V) and that is already drawn to the structure element 20. Alternatively, the transformer 40 may be provided with supply voltage via an electrically conductive telephone line 44 that also may already have been drawn to the structural element 20. Over such a telephone line 44 for example a DC-voltage of 40–50V may be provided.

According to an alternative, the contact device may be connected to an electric line 46 (see FIG. 5) that is drawn to the structural element 20. Such an electric line 46 may for example be drawn to the structural element 20 when the fibre 14 is drawn. The electric line 46 may also consist of an already provided not used electric telephone line. The electric line 46 may in turn be connected to a supply unit, for example in the form of a transformer, that provides the contact device with a suitable supply voltage and that is positioned at a distance from the structural element 20. Such a supply unit may for example be arranged in the basement of a house and provide many contact devices in the house or in the area with suitable supply voltage. The contact device may according to one alternative also be connected to a battery that functions as a back-up and that is positioned at a distance from the structural element 20, for example in the basement or in another room in a house. If such a battery is the case, there is no need for a battery back-up at the contact device itself.

Figure 7:
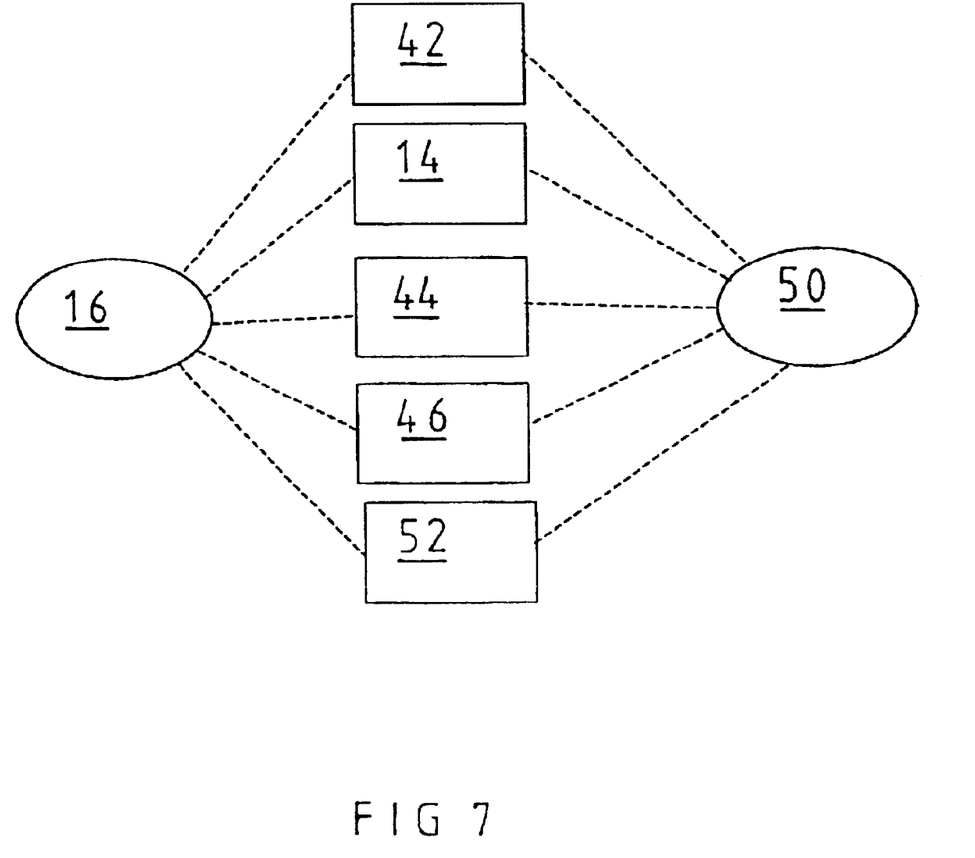
FIG. 7 shows schematically the connection of a supervisory system to a contact device.

As is schematically shown in FIG. 7, the contact device may be connected to a supervisory system 50 ("management system"), with the help of which system 50 the function of the contact device may be supervised. The one responsible for the system with fibres and contact devices may thereby supervise the function of these. For example, it may thereby be supervised if the supply voltage to the contact device functions, if transmission and/or reception is the case, etc.

The supervisory system 50 may be connected to the control circuit 16 and thereby to the contact device in different manners that are symbolised in FIG. 7. The connection may for example be via an already existing line 42 intended for AC-voltage, via an optical fibre 14, via an electric telephone line 44 that already is drawn to the structural element 20, via another line 46 that provides the contact device with supply voltage or via a separate line 52 drawn particularly in order to constitute a connection to the supervisory system.

The invention is not limited to the described embodiments but may be varied and modified within the scope of the claims.

What is claimed is:

1. A contact device, comprising:
   a carrier member;
   a receiving unit for receiving at least one optical fiber;
   a control circuit that includes a converter for converting optical signals, which are received via the at least one optical fiber, to electrical signals and to convert electrical signals to optical signals that are to be transmitted via the at least one optical fiber;
   a first contact member connected to the control circuit such that electrical signals from the converter are conducted to the first contact member and such that electrical signals from the first contact member are conducted to the converter,
   wherein the first contact member is designed such that a second contact member can be connected to the first contact member for conducting electrical signals from and to the first contact member, wherein the receiving unit, the control circuit and first contact member are fixed relative to the carrier member and wherein the contact device is designed to be fixable at a structural element in a room or other part of a building, wherein the contact device comprises a protective part that is suited to be fixed relative to the carrier member, such that, when the contact device is fixed at the structural element in a room or other part of a building and the protective part is fixed relative to the carrier member, at least the control circuit and the receiving unit are not within reach for a person that is in the room or the other part of a building without removing at least said protective part.

2. The contact device according to claim 1, wherein the contact device is designed to be fixable at least partly lowered relative to a main surface of the structural element, wherein the main surface faces the room or the part of the building, and wherein the receiving unit is fixed in a position relative to the carrier member such that, when the contact device is fixed in position at the structural element, the receiving unit is suited to receive the at least one optical fiber when the at least one optical fiber is led to the contact device via the structural element.

3. The contact device according to claim 2, wherein the receiving unit is designed to receive the at least one optical fiber in a direction defined by the receiving unit, which direction defines a straight line, wherein the receiving unit is arranged at the carrier member such that, when the contact device is fixed in position at the structural element, the line forms an angle relative to the main surface that is less than 45 degrees.

4. The contact device according to claim 1, wherein the contact device comprises support members arranged to enable winding of excess of the at least one optical fiber.

5. The contact device according to claim 1, wherein the contact device comprises indication means connected to the control circuit for indicating different states of the contact device.

6. The contact device according to claim 1, wherein the at least one optical fiber is not within reach of a person that is in the room or the other part of a building when the protective cover is fixed relative to the carrier member.

7. The contact device according to claim 1, wherein the contact device comprises a holding member for holding a battery that may be used to provide the control circuit with a supply voltage.

8. Use of a contact device according to claim 1, wherein the contact device is attached to the structural element in a room in a flat or in another part of a building.

9. The use according to claim 8, wherein the structural element comprises a recess, wherein the contact device is arranged at least partly lowered in the recess.

10. The use according to claim 8, wherein the structural element is a wall.

11. The use according to claim 8, wherein the contact device is connected to a transformer that provides the contact device with a suitable supply voltage.

12. The use according to claim 11, wherein the transformer is connected to alternating current mains.

13. The use according to claim 11, wherein the transformer is connected to an electrically conductive telephone line.

14. The use according to claim 11, wherein the transformer is also fixed at the structural element.

15. The use according to claim 8, wherein the contact device is connected to an electric wire that is drawn to the structural element and that also is connected to a supply unit that provides the contact device with a suitable supply voltage, wherein this supply unit is positioned at a distance from the structural element.

16. The use according to claim 8, wherein the contact device is connected to a supervisory system, with the help of which system the function of the contact device may be managed.

* * * * *